United States Patent [19]

Farwaha et al.

[11] Patent Number: 5,240,982
[45] Date of Patent: Aug. 31, 1993

[54] AMPHOTERIC SURFACTANTS AND COPOLYMERIZABLE AMPHORTERIC SURFACTANTS FOR USE IN LATEX PAINT

[75] Inventors: Rajeev Farwaha, Brampton; William Currie, Elmira, both of Canada

[73] Assignee: National Starch and Chemical Investment Holding Corporation, Wilmington, Del.

[21] Appl. No.: 746,844

[22] Filed: Aug. 19, 1991

Related U.S. Application Data

[62] Division of Ser. No. 537,711, Jun. 13, 1990, Pat. No. 5,064,888.

[51] Int. Cl.$^5$ .............................................. C08K 5/17
[52] U.S. Cl. .................................... 524/238; 524/236
[58] Field of Search ................................ 524/238, 236

[56] References Cited

U.S. PATENT DOCUMENTS 4,529,762  7/1982  Hoefer et al. ........................ 524/157

FOREIGN PATENT DOCUMENTS 57-074371  5/1982  Japan .

Primary Examiner—Joseph L. Schofer
Assistant Examiner—Jeffrey T. Smith
Attorney, Agent, or Firm—Jane E. Gennaro; Edwin M. Szala

[57] ABSTRACT

Amphoteric surfactants and copolymerizable amphoteric surfactants for use in latex paints are presented. These surfactants, which contain positively charged nitrogen, are incorporated into the paint formulations at low levels and impart superior wet adhesion and freeze-thaw stability.

7 Claims, No Drawings

AMPHOTERIC SURFACTANTS AND COPOLYMERIZABLE AMPHORTERIC SURFACTANTS FOR USE IN LATEX PAINT

This application is a division of U.S. Ser. No. 07/537,711 filed Jun. 13, 1990 now U.S. Pat. No. 5,064,888.

BACKGROUND OF INVENTION

Latex-based paints have captured a significant portion of both the indoor and outdoor paint markets due to a number of significant advantages these paints possess over the solvent-based paint products. The primary advantages are low odor, easy clean-up, and fast dry, however, the paints suffer from the drawback of poor "wet adhesion".

Latex-based paints generally comprise three components, an emulsion polymer or copolymer which is film forming (the latex), an aqueous phase (which contains, inter alia, additives such as pigments, defoamers and antifreeze agents) and one or more surfactants. Various additives are often contained in the formation as particular applications dictate.

Two types of emulsion polymers are generally used in formulating latex paints. The first type comprises copolymers of alkyl esters of acrylic and methacrylic acid with minor amounts of acrylic and methacrylic acid and are termed "all acrylic". All acrylic paints produce hard coatings which are resistant to scrubbing and provide good water resistance and wet adhesion. However, because of the cost of the acrylic monomers all acrylic paints are mainly used in premium or high quality paints.

The second type of latex comprises vinyl acetate terpolymers in combination with softer acrylic monomers. This type of latex, often called "vinyl acrylic", are cheaper than the all acrylics. The paints produce films which are hard, but tend to have a much lower wet adhesion than their acrylic based counterparts.

The term "wet adhesion" is used in the paint industry to describe the ability of a paint to retain its adhesive bond (to the substrate) under wet (or high humidity) conditions. Organic solvent-based paints generally exhibit good wet-adhesion but water-based (latex) paints often tend to exhibit reduced wet-adhesion under wet or humid conditions. This inherent deficiency severly limits the utility of latex paints in areas where humid environments might be encountered, e.g. exteriors, bathrooms and kitchens. Further, painted surfaces which become soiled must be washed and cleaned, often using water and abrasive scrubbing compounds. Because of their tendency to have lower wet-adhesion, the latex paints are also much less scrub-resistant than their organic solvent based counterparts.

Much effort has been devoted in recent years to improving the wet adhesion of latex-based paints. Some researchers have attempted to vary various paint formulation component parameters, such as pigment types, dispersant types, and coalescing agents to improve wet adhesion; however the most significant improvements in wet adhesion properties has been obtained by the functional modification of the copolymeric backbone of the latex. Specifically, incorporation of amine, amide, and acetoacetate functionalities into the copolymer have shown promising results. For example, cyclic ureido derivatives have been described in the patent literature as imparting wet adhesion properties, e.g. U.S. Pat. Nos. 4,104,220, 4,111,877, 4,219,454, 4,319,032 and 4,599,417.

These compounds are described as improving wet adhesion properties for vinyl acetate terpolymers when copolymerized with them. However, wet adhesion monomers are very expensive and their inclusion results in a drastic increase in the cost of the vinyl acetate terpolymers and all-acrylic copolymers used in the paint.

A further problem observed with latex paints is that of destabilization due to freezing and thawing. During freeze-thaw cycling, the anionic surfactants commonly employed in latex paints tend to desorp from the latex particles, thereby increasing the ionic strength of the aqueous phase, ultimately resulting in paint coagulation due to destabilization of the electronic double layer surrounding each particle. Thus, the viscosity of the paint will vary as more freeze/thaw cycles are encountered. Ordinarily, antifreeze compounds (e.g. ethylene glycol) are added to the paints to combat this, but this contributes to the cost of the paint and also requires the use of volatile organic compounds.

Researchers have attempted to alleviate this problem by using blends of surfactants in place of the anionic surfactant. For example, U.S. Pat. No. 3,193,517 discloses a method for making a viscosity-stable latex by blending a cationic surfactant, an amphoteric surfactant, and a nonionic surfactant in a prescribed ratio. However, the blended system is not entirely satisfactory in many other respects.

There exists a real need for both wet-adhesion promoters and viscosity stabilizers for use in latex paints.

The onset of paint coagulation can therefore be delayed or eliminated entirely.

The amphoteric surfactants of this invention can thus be used to produce latex paints having wet adhesion values in the range of the alkyds, even when vinyl acrylics are used in the paint, which also are more stable toward freeze/thaw cycling than conventional latex paints.

DETAILED DESCRIPTION OF INVENTION

The amphoteric surfactants of this invention comprises three main types:

1. $SO_3^-$ containing surfactants of the formula

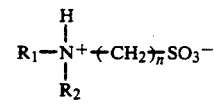

wherein
$R_1 = C_8-C_{20}$ alkyl, preferably $C_8-C_{12}$ alkyl
$R_2 = H$ or $C_1-C_2$ alkyl, preferably methyl
$n = 2-6$, preferably 2

2. $COO^-$ containing surfactants of the formula

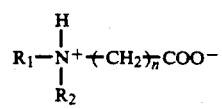

wherein
$R_1 = C_8-C_{20}$ alkyl, preferably $C_8-C_{12}$ alkyl
$R_2 = H$ or $C_1-C_2$ alkyl, preferably methyl
$n = 1-4$, preferably 1

3. Copolymerizable amphoteric surfactants of the formula $$CH_2=C(CH_3)-C(=O)-O-(CH_2)_a-N^+(R_1)(R_2)-(CH_2)_b-X^-$$

wherein
R$_1$ = C$_1$-C$_2$ alkyl
R$_2$ = C$_1$-C$_2$ alkyl
X$^-$ = SO$_3^-$— or COO$^-$
a = 2-3
b = 1-6

The first two types are surfactants which are used in the latex preparations at a concentration of 1-4 pphm (parts per hundred monomer, by weight) and yield superior wet adhesion.

The third type is a copolymerizable amphoteric surfactant which is actually copolymerized into the polymeric backbone of the latex copolymer. The surfactant is incorporated at a rate of 1-3 pphm.

While the above amphoteric surfactants may be utilized as the only wet adhesion monomer/surfactant in the paint formulation, it has been found that inclusion of small amounts of non-ionic surfactants of the general formula $$R-O-(CH_2-CH_2-O)_n-H$$

wherein
R = C$_4$-C$_{12}$ alkylphenol or C$_4$-C$_{18}$ alkyl, preferably C$_8$-C$_9$ alkylphenol or C$_{12}$-C$_{15}$ alkyl and n is about 20-50 in the formulation serves to stabilize the latex emulsion and enhance mechanical stability.

The nonionic surfactants are preferably incorporated at a level of 1-3, preferably 2.5 pphm when the blended surfactants are used, and 0.5-0.7 pphm when the copolymerizable amphoteric surfactants are used.

The above amphoteric surfactants can be used with virtually any latex paint system including vinyl acrylic and all acrylic systems. The surfactants improve the wet adhesion of the paints, especially the vinyl acrylics, and stabilize the paints toward freeze-thaw cycling. This second property is particularly advantageous as it permits the reduction or elimination of the antifreeze agent, typically ethylene glycol, in the paint. Ordinarily paint formulations contain significant amounts of antifreeze (5-10% by wt or more). As environmental concerns are increasing, the demand for paints with low or no volatile organic compounds (VOC) paints is increasing. The use of these surfactants will aid in this reduction, permitting low (<2% by wt) or no VOC formulations to be prepared.

EXAMPLES

The following examples illustrate certain preferred embodiments of the invention, but are not intended to be illustrative of all embodiments.

Example I—Production of a MMA/BA latex

This example illustrates the preparation of an all-acrylic (methyl methacrylate butyl acrylate) latex containing a standard wet adhesion monomer Sipomer® WAM (a product of Alcolac Ltd.) using an anionic surfactant sodium lauryl sulfate (Sipex® UB of Alcolac, Ltd.).

Briefly, a 12-liter stainless steel reactor, the primary vessel, was charged with the following:

| Compound | Grams | Concentration in PPHM[1] |
| --- | --- | --- |
| H$_2$O | 1991 | 59.17 |

A monomer pre-emulsion was formed in secondary vessel I comprising:

Secondary Vessel I

| Compound | Grams | Concentration in PPHM[1] |
| --- | --- | --- |
| Butyl Acrylate (BA) | 1742 | 51.8 |
| Methyl Methacrylate (MMA) | 1623 | 48.23 |
| Water | 654 | 19.43 |
| Sipex UB (27%) | 182 | 5.40 |
| Rexol 25/407 (70%) | 88 | (1.5 part solids) 2.61 |

Three other secondary vessels were charged as follows:

| Compound | Grams | Concentration in PPHM[1] |
| --- | --- | --- |
| Secondary Vessel II | | |
| Ammonium Persulfate | 14.0 | 0.42 |
| H$_2$O | 250 | 7.43 |
| Secondary Vessel III | | |
| H$_2$O | 100.0 | 2.97 |
| Sipomer WAM | 38.0 | 1.13 |
| Secondary Vessel IV | | |
| H$_2$O | 300 | 0.9 |
| SMBS | 10 | 0.3 |

Notes:
[1] based on the final formulation

Initially, mild agitation was affected in the primary vessel and the reaction content was heated to 55° C. Subsequently added were 164 gm of pre-emulsion Secondary Vessel I) 24 gm of A.P. solution (Secondary Vessel II), and 29 gm of SMBS solution (Secondary Vessel IV). After incubation of the mixture for 10 minutes the remaining contents of secondary vessels I, II, III, and IV were added and the pH of the resultant emulsion was then adjusted to 8 by the addition of 26.6% aqueous ammonium hydroxide solution.

The particle size of the latex was determined by a BI-90 particle size analyzer (Brookhaven Instruments). The resultant latex (Acrylic A) had a solid content of 50%, the average particle size diameter was 164 nm and the viscosity was 90 cps.

A second latex (B) was prepared according to the above procedure, except that Siponate DS-10 (sodium dodecyl benzene sulfonate) at 1.6 pphm was substituted for the Sipex® UB (sodium lauryl sulfate) in secondary vessel I. The resulting latex (Acrylic B) had a solid content of 50 percent and an average particle size of 150 nm.

A third emulsion analogous to Acrylic B was made except no Sipomer WAM was introduced in secondary vessel III, and was identified as Acrylic C. The resulting emulsion had solid content of 50% and an average particle size of 174 nm.

Example II—Preparation of all acrylic Latexes

Two all acrylic latexes were synthesized each employing amphoteric surfactants of this invention namely N,N-Dimethyl-N-lauryl-N-(3-Sulfopropyl) ammonium-betaine (Hartomer HB 5175 of Hart Chemical Ltd.), and Cocoammonium betaine (Hartomer HB6300).

The acrylic latexes, identified as D and E, were prepared essentially following the procedure in Example I wherein 1.6 parts per hundred monomer of amphoteric surfactants namely, Hartomer HB-5175 and, Hartomer HB-6300 respectively, were used instead of Sipex UB. The following properties were observed:

|  | Latex | |
| --- | --- | --- |
|  | D | E |
| particle size (nm) | 360 | 310 |
| viscosity (cps) | 25 | 27 |
| % solids | 49.9 | 49.9 |

Example III—Preparation of Latex Paint Formulations

To assess the utility of the above latexes in paint, the following paint formulations was prepared by mixing the following ingredients:

| Semi Gloss Paint Screening Formula I | |
| --- | --- |
| Compounds | Grams |
| Ethylene Glycol | 81 |
| Colloid 226-35 (1) | 7.5 |
| Drew L-475 (2) | 3.0 |
| Water | 30 |
| Titanox 2020 (3) | 300 |
| Snowhite 10-1 (4) | 50 |
| Disperse to 5-6 Hegman (5) and add: | |
| Water | 265 |
| Methocel J5MS (6) | 2 |
| Latex | 530 |
| Rexol 25/9 (7) | 4.0 |
| Texanol (8) | 10.0 |
| AMP-95 (9) | 3.0 |
| UCAR SCT-275 (10) | 25.0 |
| Kathon LX (11) | 3.0 |
| Drew L-475 (2) | 6.0 |

Notes:
(1) A non foaming, water soluble anionic dispersant containing 35% of active, and having a pH of 7.5 and specific gravity of 1.23.
(2) A defoamer prepared from a blend of mineral oils and silica derivatives containing 100% of active material.
(3) Rutile titanium dixoide, also known as Tioxide HD6X.
(4) Calcium carbonate having the properties:

| CaCO$_3$ | 92.5% |
| --- | --- |
| dry brightness | 95.5 |
| specific gravity | 2.65 |
| less than 10 microns | 90% |
| mean particle size | 3 microns |
| Hegman grind | 6.5 |
| oil absorption | 16 |

(5) A grind measurement used by the paint industry.
(6) Hydroxy propyl cellulose.
(7) An ethoxylated nonyl phenol surfactant (nonionic) containing 9 to 10 moles of ethylene oxide.
(8) 2,2, 4-Trimethylpentanediol-1,3, monoisobutyrate and used as coalescing agent.
(9) 2-amino-2-methyl-1-propanol.
(10) A non-ionic water-soluble polyether-polyurethane thickener.
(11) A microbiocide having, as active ingredients, 5-chlor-2-methyl-4-isothiazolin-3-one and 2-methyl-4-isothiazolin-3-one and containing 14% active ingredients.

The ingredients were mixed for 15 minutes, after which the formulation was ready for use.

A second paint formulation, SEMI-GLOSS PAINT SCREENING FORMULA (II), was prepared following the recipe in SEMI-GLOSS PAINT SCREENING FORMULA (I) except 20 gram of ethylene glycol was used instead of 81 gm of ethylene glycol.

Example IV—Freeze-Thaw Stability

The paint compositions made employing acrylic latexes A-E were tested for freeze-thaw stability in semi-gloss paint screening formula (I). Briefly, the paint formulations were subjected to repeated freeze-thaw cycling by chilling to −18° C. for 16 hours subsequently warming to room temperature for 8 hours. The test was continued until the latex coagulated, or to a maximum of five (5) cycles. The results are presented below:

|  | Latex | | | | |
| --- | --- | --- | --- | --- | --- |
| Surfactants: | A | B | C[b] | D | E |
|  | Concentration (pphm) | | | | |
| Sipex UB | 1.5 | X | X | X | X |
| Siponate DS-10 | X | 1.6 | 1.6 | X | X |
| Hartomer HB-575 | X | X | X | 1.6 | X |
| Hartomer HB-6300 | X | X | X | X | 1.6 |
| Freeze-thaw (No. of Cycles) | 1 | 1 | 1 | 5 | 5 |
| OBSERVATION | COAGULATE | COAGULATE | COAGULATE | LIQUID | LIQUID | a. In parts per hundred monomer
b. No wet adhesion monomer on polymer backbone

Formulations A–C employing standard anionic surfactants coagulated after a single cycle, while D and E, which employed the amphoteric surfactants of this invention were stable (still liquid) after 5 cycles.

Example V—Scrub Resistance

A sixth acrylic latex, identified as Latex F was synthesized using the procedure shown in Example I. The following monomer and surfactant composition (in pphm) were used:

| Butyl acrylate (BA) | 52.0 |
| --- | --- |
| Methyl methacrylate (MMA) | 48.0 |
| Methacrylic acid (MAA) | 1.2 |
| Sipomer WAM | 1.0 |
| Sipex UB | 1.0 |
| Rexol 25/407 | 4.3 |
| Product Properties: | |
| % Solids, 50; particle size (nm) 105; | |
| Grits (200M) .001. | |

Another all acrylic latex, G, was synthesized following analogous procedure to acrylic resin F except Hartomer MB-5175 was substituted for Sipex UB. Latexes F and G were respectively tested for freeze-thaw and wet adhesion in semi-gloss paint screening formula (I). both of these latexes differed from the latexes of Example I as follows:

1. MAA was introduced on the polymer backbone;
2. The anionic surfactant level was lowered;
3. The noionic surfactant level was increased.

These latexes were subjected to a standard wet adhesion test procedure, as follows: Briefly, a leneta scrub panel was prepared by making a drawdown of a standard semi-gloss alkyd base (this base was chosen as being the most difficult test for wet adhesion), using a 3-mil base. The panels were then aged at least a week at room temperature.

Subsequently, the test latex was drawn down on aged alkyd surface using a 3-mil bird applicator and allowed to dry for 48 hours. The following abrasive scrub resistance test procedure then was followed:

1. The test chart was affixed to a glass panel and put into the scrub machine;
2. The test brush was immersed in warm water for 30 minutes to condition before tests;

3. Ten (10) separate containers 8 gms. each of Ajax (abrasive cleanser) were weighed out;
4. The test brush was placed in the holder and then put over top of the test chart, 200 gm of warm water were then added;
5. The scrub machine was then started and run for 400 strokes;
6. If the coating remained intact, 8 gm dry Ajax were then placed under the brush, and the machine was run 100 strokes.
7. Step 6 was repeated until coating failure, i.e., when paint strips from the alkyd.

The number of brush scrubs to achieve failure is recorded.

The results are presented below:

|  | Acrylic Resin F | Acrylic Resin G |
|---|---|---|
| Wet Adhesion (Scrubs to failure) | 1100 | 1743 |
| Freeze-thaw (no of cycles stable) | 3 | 5 |
| Observation | 4th cycle coagulation | liquid |

The above example demonstrates that amphoteric surfactants of this invention, even when used together with wet adhesion monomer Sipomer WAM, enhances the wet adhesion capabilities of the acrylic latex.

Example VI—Freeze-Thaw Stability, Low Ethylene Glycol Formulations

Latexes A and D were tested in SEMI-GLOSS PAINT SCREENING FORMULA (II) wherein the amount of ethylene glycol (anti-freezing compound) was lowered to one fourth the level as compared to ethylene glycol in formula I.

|  | Acrylic Resin | |
|---|---|---|
|  | D | A |
| Ethylene Glycol (%) | 1.5 | 6.14 |
| Freeze-thaw | PASS (remained liquid for five cycles) | FAIL (coagulated after 1 cycle) |

This example shows that latex synthesized employing amphoteric surfactants imparts freeze-thaw stability in the paint composition. The amount of ethylene glycol can, thus, be significantly lowered as shown in the above example.

Example VII—Electrolyte Tolerance

An acrylic latex, H, was synthesized using amphoteric surfactant Hartomer HB-5175 following the procedure for resin D, except that 7.8 pphm $CaCl_2$ was added to the initial charge and no Sipomer WAM was used. The resultant formulation had the following physical properties: % Solids 52.0; particle size (nm) 484; grits (100M) 0.0016.

An attempt to synthesize a latex using an anionic surfactant (Sipex UB) in the presence of 2.5 pphm of $CaCl_2$ was unsuccesful due to coagulation of the formulation.

Thus, latexes made using the amphoteric surfactants of the invention are more tolerant to electrolytes as compared to those made with anionic surfactants.

Example VIII—Vinyl Acrylic Latexes

A vinyl-acrylic emulsion, made with anionic and nonionic surfactants and containing no wet adhesion monomer was obtained commercially. The product characteristics are listed below:

| Latex I | |
|---|---|
| % Solids | 55.0 |
| Viscosity (cps) | 1000–2000 |
| pH | 5–6 |
| Particle size | 350–450 nm |

Example IX—Wet Adhesion of Vinyl Acrylic Latexes

A vinyl acetate copolymer having the same basic formula as Latex I, was synthesized by substituting 1 pphm of amphoteric surfactant Hartomer HB-5175 for the anionic surfactant. This was identified as Latex J.

Both latexes were incorporated in SEMI-GLOSS PAINT SCREENING FORMULATION I, and the resultant formulations were examined for scrub resistance (wet adhesion) following the procedure of Example V. The results are summarized below:

|  | Latex | |
|---|---|---|
|  | I | J |
| Wet Adhesion (scrubs to failure) | 92 | 480 |

Thus, the wet adhesion capabilities of vinyl acrylic latex paints can be greatly improved by using amphoteric surfactant instead of anionic surfactants.

Example X—Preparation of Latexes with Copolymerizable Amphoteric Surfactants An all acrylic latex polymer, identified as Latex K was synthesized using an amphoteric copolymerizable surfactant of this invention, namely N(3-Sulfopropyl)-N-methacryloxyethyl-N, N-dimethyl ammonium betaine (Hartomer HB-6380, Hart Chemical, Ltd.). The following monomer and surfactant compositions in parts per hundred monomer (pphm) were used to synthesize the acrylic latex:

| BA | 5.05 |
|---|---|
| MMA | 48.5 |
| AA | 1.0 |
| HB-6380 | 2.2 |
| Rexol 25/40 | 0.6 |

The following properties were observed:

| Particle size (nm) | 540 |
|---|---|
| Viscosity (cps) | 34.0; |
| pH | 7.0 |
| % solids | 51.06 |

A second latex, identified as Latex L, was made employing anionic surfactant Siponate DS-10 instead of the amphoteric surfactant. Latex K and L were tested for freeze thaw stability in SEMI-GLOSS PAINT SCREENING FORMULATION I, except that no ethylene glycol was added.

|  | Emulsion | |
|---|---|---|
|  | K | L |
| freeze-thaw (no of cycles) | 5 (still liquid after 5 cycles) | — (coagulated after 1 cycle) |

Thus, the paint formulation containing copolymerizable amphoteric surfactant exhibited a good freeze-thaw stability, even without ethylene glycol.

Example XI—Freeze-Thaw Stability

An all acrylic latex of this invention, identified as Latex M was synthesized using an amphoteric copolymerizable surfactant namely N-(aceto)-N-methacryloxyethyl-N,N-dimethyl ammonium betaine (Hartomer HB-6420, Hart Chemical, Ltd.) as in Example X. The resultant latex had the following physical properties: % Solids 51.8; Particle size (nm) 471; pH 5.0; Grits (200M) 0.013.

Latex M was formulated in SEMI-GLOSS PAINT SCREENING FORULATION I, except that no ethylene glycol was added, and tested for freeze thaw stability.

The Latex M exhibited no coagulation after five cycles.

Example XII

All acrylic latex N was manufactured employing an anionic copolymerizable surfactant, namely sodium salt of allyl ether sulfonate (Alcolac Ltd.), in place of the copolymerizable amphoteric surfactant of Example X. The resultant latex had the following physical properties: % Solids 52.6; particle size (nm) 533; grits (200M) 0.006. The latex N was formulated in SEMI-GLOSS PAINT SCREENING FORMULATION I, having the amount of ethylene glycol noted below:

|  | Emulsion | | |
|---|---|---|---|
|  | L | M | N |
| % Ethylene Glycol | 0 | 0 | 3 |
| Paint Properties: |  |  |  |
| freeze-thaw (no of cycles) | 5$^a$ (PASS) | 5$^a$ (PASS) | 2$^b$ |

Notes:
$^a$Remained liquid after 5 cycles
$^b$Coagulated after 2 cycles

Thus, the paints formulated with the amphoteric copolymerizable surfactants of this invention exhibit superior freeze-thaw stability, as compared with a paint formulation containing an anionic copolymerizable surfactant and ethylene glycol.

Example XIII

An all acrylic latex, identified as O, was synthesized using cationic copolymerizable surfactant namely methacrylamidopropyl-trimethyl ammonium chloride in place of the copolymerizable amphoteric surfactant of Example X. The following physical characteristics were obtained. % solids 49.5; particle size (nm) 302; pH 7.0; Viscosity (cps) 38; Grits (200M) 0.0013.

Latex was formulated in Semigloss Paint Formula II of Example III and tested for freeze-thaw stability. It coagulated during first cycle. Thus the paints formulated with amphoteric copolymerizable surfactants of this invention exhibit superior freeze-thaw strength compared to those using copolymerizable cationic surfactants.

Example XIV

Using the copolymerizable amphoteric surfactant monomer Hartomer HB-6380 a styrene (St) latex identified as Latex P, was made. The following monomer and surfactant composition in pphm was used to make styrene acrylate copolymer.

|  | In PPHM |
|---|---|
| Styrene | 15.0 |
| BA | 53.5 |
| MMA | 30.7 |
| Acryic Acid (AA) | 1.0 |
| Hartomer HB-6380 | 2.2 |
| Rexol 25/40 | 0.6 |

The resultant product had the following physical properties: % solids 52.3; particle size (nm) 351; Viscosity (cps) 30.0.

Latex P was tested in Semigloss Paint Formula II of Example III wherein no ethylene glycol was present. The paint showed no sign of coagulation after 5 freeze-thaw cycles.

Example XV

Using Hartomer HB-6380 monomer, a film forming all acrylic emulsion, (Identified as Latex Q) was produced. The following ingredient compositions in pphm were used: BA 53; MMA 45.5; AA 1.0; HB-6380 2.2; Rexol 25/40 1.1. The following physical properties were observed: % solids 53.0; pH 7.0; particle size (nm) 351. The above resin was formulated into Semigloss Paint Test Formula II of Example III wherein no ethylene glycol and no Texanol (coalescing solvent) was added to furnish a solventless paint composition. The paint was tested for freeze-thaw stability and scrub resistance. The following results results were obtained:

| Emulsion | Q | B |
|---|---|---|
| Surfactant | HB-6380 | Siponate DS-10 |
| F/T cycles | 5 (Pass) | 1 (Fail) |
| Scrubs | 2552 | 1300 |

This example shows that solventless paint made with Latex Q showed superior freeze-thaw stability and scrub resistance (water resistance) as compared to the same paint made with Latex B using a conventional surfactant.

It is apparent that many modifications and variations of this invention as hereinabove set forth may be made without departing from the spirit and scope thereof. The specific embodiments described are given by way of example only and the invention is limited only by the terms of the appended claims.

What is claimed is:

1. An improved latex for use in aqueous-based latex paint formulations which comprises a latex copolymer, dispersed in water in the presence of a surfactant wherein the improvement comprises using as the surfactant about 1–4 pphm of an amphoteric surfactant of the formula

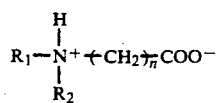

wherein:
$R_1 = C_8$–$C_{20}$ alkyl
$R_2 = H$ or $C_1$–$C_2$ alkyl
$n = 1$–$4$
such that the latex paint formulation exhibits enhanced wet adhesion and freeze-thaw stability.

2. The latex of claim 1, wherein the surfactant further comprises about 1–3 pphm of a nonionic surfactant of the formula R—O—(CH$_2$—CH$_2$—O)$_n$—H wherein C$_4$-C$_{12}$ alkylphenol or C$_4$-C$_{18}$ alkyl and n is about 20–50.

3. The latex of claim 1, wherein the latex copolymer is an all acrylic latex copolymer.

4. The latex paint formulation of claim 1, wherein the latex copolymer is a vinyl acrylic latex or a styrene acrylic latex copolymer.

5. A latex paint formulation which comprises the latex of claim 1, an aqueous base, and, optionally an organic antifreeze agent.

6. The paint formulation of claim 5, which contains up to 2%, by wt, of an organic antifreeze agent.

7. A method for improving the freeze-thaw stability and wet adhesion of a latex copolymer for use within an aqueous based latex paint formulation that comprises preparing the latex copolymer in the presence of about 1–4 pphm surfactant of the formula

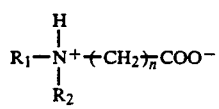

wherein $R_1 = C_8$–$C_{20}$ alkyl; $R_2 = H$ or $C_1$–$C_2$ alkyl; and $n = 1$–$4$.

* * * * *